US011951606B1

(12) United States Patent
Kordus et al.

(10) Patent No.: US 11,951,606 B1
(45) Date of Patent: Apr. 9, 2024

(54) HANDLE AND TOOL WITH INTEGRATED HANDLE MOUNT

(71) Applicant: Snap-on Incorporated, Kenosha, WI (US)

(72) Inventors: Bryan J. Kordus, Kenosha, WI (US); Isidro Alanis, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/966,458

(22) Filed: Oct. 14, 2022

(51) Int. Cl.
*B25G 1/00* (2006.01)
*B25F 5/02* (2006.01)

(52) U.S. Cl.
CPC .................................... *B25F 5/026* (2013.01)

(58) Field of Classification Search
CPC . A01B 1/026; B25F 5/02; B25F 5/025; B25F 5/026; B25B 13/52; B25D 17/04; B25D 17/043; B23B 45/001; B25G 1/002; B25G 1/005; B25G 1/102; B25G 1/10; B25G 3/00; B25G 3/02; B25G 3/18; B25G 3/20; B25G 3/24; B25G 3/26; B25G 3/28; B25G 3/30
See application file for complete search history.

(56) References Cited

U.S. PATENT DOCUMENTS 5,049,012 A 9/1991 Cavedo
5,607,266 A 3/1997 Anderson
6,499,219 B1 12/2002 Wightman
8,132,296 B2 3/2012 Di Nicolantonio
8,371,708 B2 2/2013 Nagasaka et al.
8,621,719 B2 1/2014 Nakashima et al.
8,813,868 B2 8/2014 Limberg et al.
8,967,923 B2 3/2015 Lerch
9,308,638 B2 4/2016 Kondo et al.
9,463,566 B2 10/2016 Yoshikane et al.
9,776,296 B2 10/2017 Brewster et al.
9,815,185 B2 11/2017 Machida
9,868,201 B2 1/2018 Kamiya
9,914,205 B2 3/2018 Chen et al.
10,695,880 B2 6/2020 Brewster et al.
11,077,533 B2 8/2021 Limberg et al.
11,583,992 B2 * 2/2023 Dales ...................... B25F 5/026
(Continued)

FOREIGN PATENT DOCUMENTS

CN 203305191 U * 11/2013
CN 215358291 U * 12/2021
(Continued)

*Primary Examiner* — Chuck Y Mah
(74) *Attorney, Agent, or Firm* — Seyfarth Shaw LLP

(57) ABSTRACT

A handle and a tool housing that includes features that matingly engage or receive portions of the handle. The handle is adapted to couple onto an exterior surface of the tool housing, and minimize damage caused to the tool when the tool is dropped with the handle attached. In an example, the handle includes a shaft and first and second clamping portions, where each of the first and second clamping portions includes a protrusion that engages a pocket or groove on the tool housing. The shaft extends through the first clamping portion and threads into the second clamping portion, and as the shaft is threaded into the second clamping portion the first and second clamping portions are moved closer together and clamp onto the tool housing.

23 Claims, 8 Drawing Sheets

(56) References Cited

U.S. PATENT DOCUMENTS

| | | | | |
|---|---|---|---|---|
| 2007/0209162 | A1 * | 9/2007 | McRoberts | B25F 5/026 16/426 |
| 2009/0133889 | A1 * | 5/2009 | Keller | B25F 5/026 173/104 |
| 2014/0020210 | A1 * | 1/2014 | Brennenstuhl | B25G 1/00 16/426 |
| 2014/0251649 | A1 | 9/2014 | Kondo | |
| 2015/0107865 | A1 * | 4/2015 | Chen | B25F 5/026 81/489 |
| 2015/0174753 | A1 * | 6/2015 | Kamiya | B25F 5/02 16/426 |
| 2015/0306758 | A1 | 10/2015 | Chen et al. | |

FOREIGN PATENT DOCUMENTS

| | | | | | |
|---|---|---|---|---|---|
| CN | 217225436 | U | * | 8/2022 | |
| DE | 102007047030 | A1 | * | 4/2009 | B23B 45/001 |
| JP | 2001300868 | A | * | 10/2001 | |
| JP | 2013233637 | A | * | 11/2013 | |
| JP | 2021160076 | A | * | 10/2021 | |
| KR | 2021069157 | A | * | 6/2021 | B23B 45/001 |

* cited by examiner

HANDLE AND TOOL WITH INTEGRATED HANDLE MOUNT

TECHNICAL FIELD OF THE INVENTION

The present invention relates generally to a handle for a tool and a tool housing onto which the handle can be mounted, and more particular to a handle for a power tool and a power tool housing onto which the handle can be mounted.

BACKGROUND OF THE INVENTION

Power tools, such as drills, are commonly used to complete industrial or home improvement tasks. Many power tools are portable and battery-powered, allowing a user to apply torque or force on a workpiece without exerting a substantial amount of energy. However, many power tools produce significant vibrations and rotational forces during use, or can otherwise be difficult to control due to the amount of power transmitted from the tool to the workpiece or working material.

Several attempts have been made to resolve the above issue. For example, secondary handles have been developed that allow a user to hold and operate the power tool with one hand via a primary handle, and control the movement of the power tool by gripping the secondary handle with the other hand. The secondary handle may also normally be removed from the tool and allow a conventional, secondary handle-free operation of the tool based on the preference of the user.

Conventional secondary handles typically include a band type clamp that clamps directly onto and around the exterior of the housing of the tool. However, this configuration requires that the band clamp be sufficiently tightened to ensure that it does not disassemble, but can also damage the tool if excessive force is applied to clamp the secondary handle on the tool Moreover, it can also cause damage to the tool if the tool is dropped with the secondary handle attached, which can render the tool inoperable.

SUMMARY OF THE INVENTION

The present invention relates broadly to a secondary or auxiliary handle for a tool, such as a power tool, and a tool housing that includes features that matingly engage or receive portions of the handle. The handle is adapted to couple to an exterior surface of the tool housing, and minimize damage caused to the tool if the tool is dropped with the handle attached. In an embodiment, the handle includes a gripping portion, a shaft extending from the gripping portion, and first and second clamping portions, wherein each of the first and second clamping portions includes a protrusion that engages or otherwise keys into a corresponding pocket or groove on the tool housing. When coupled to the tool, the shaft is disposed through an aperture in the first clamping portion and threaded into a threaded aperture in the second clamping portion. As the shaft is threaded into the second clamping portion, the first and second clamping portions are moved or brought closer together to clamp onto the tool housing. The first clamping portion may include a reinforcing rib to provide structural stability and robustness to the handle. The first and second clamping portions may also include a stop mechanism that prevents the first and second clamping portions from being over tightened onto the tool housing, thus minimizing damaging the tool housing.

In an embodiment, the present invention relates to a tool, such as a power tool, that includes a tool housing having first and second portions. First and second grooves are respectively disposed in the first and second portions. A handle is adapted to removably couple to the tool housing. The handle includes a shaft having first and second shaft ends, and first and second clamping portions adapted to removably couple to the second shaft end, wherein the first clamping portion includes a first protrusion adapted to matingly engage the first groove, and the second clamping portion includes a second protrusion adapted to matingly engage the second groove.

In another embodiment, the present invention relates to a housing for a tool, such as a power tool. The housing is adapted to removably couple to an auxiliary handle having first and second protrusions. The housing includes first and second housing portions forming respective first and second sides of the housing, and first and second grooves respectively disposed in the first and second housing portions, wherein the first and second grooves are adapted to respectively receive the first and second protrusions of the auxiliary handle.

In another embodiment, the present invention relates to a handle for a tool, such as a power tool, wherein the tool includes a housing having first and second grooves. The handle includes a gripping portion, a shaft extending from the gripping portion and having a shaft end opposite the gripping portion, and first and second clamping portions adapted to removably couple to the shaft end, wherein the first clamping portion includes a first protrusion adapted to matingly engage the first groove, and the second clamping portion includes a second protrusion adapted to matingly engage the second groove.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
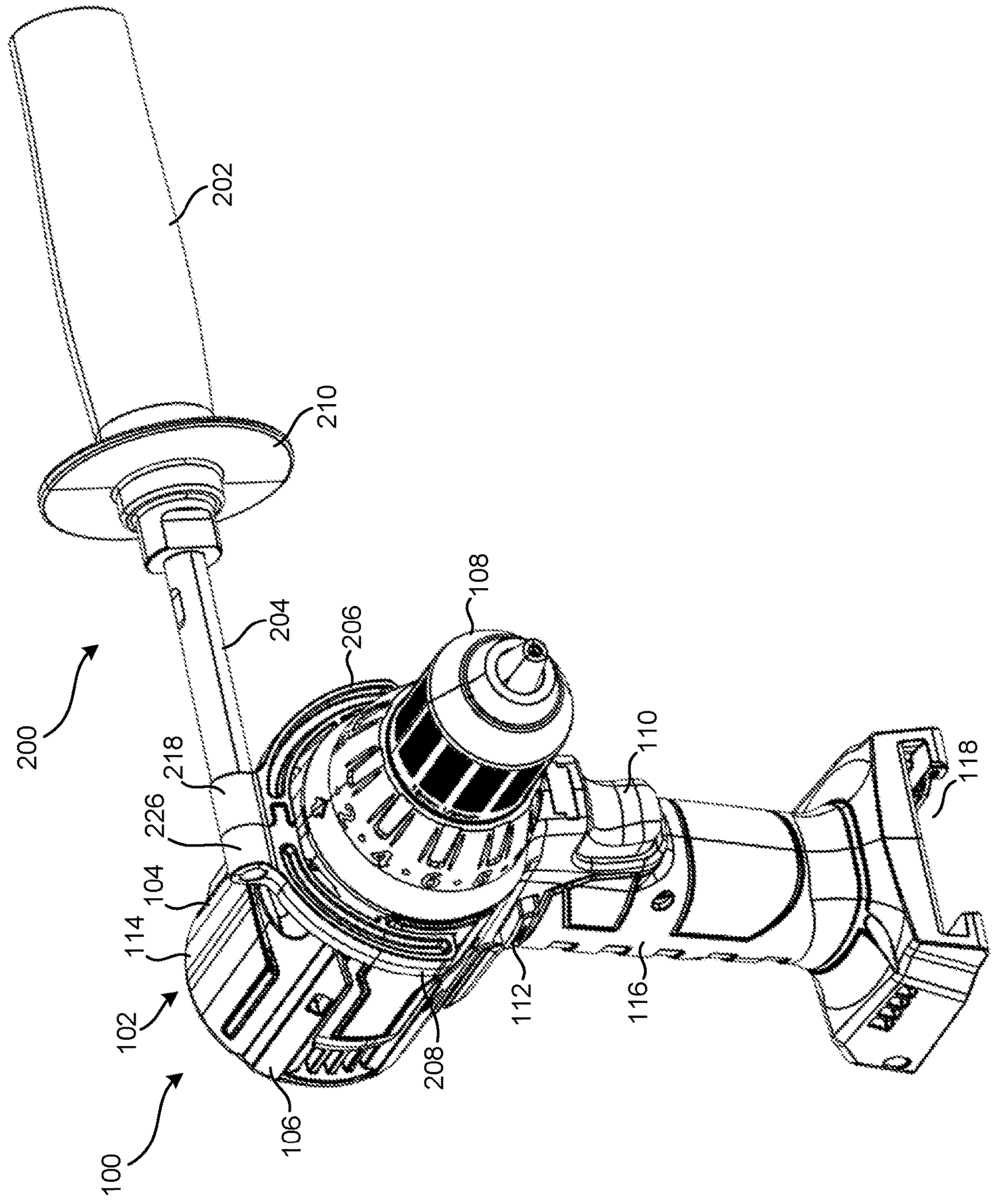
FIG. 1 is a perspective view of an exemplar tool with a handle coupled to the tool, according to an embodiment of the present invention.
Figure 2:
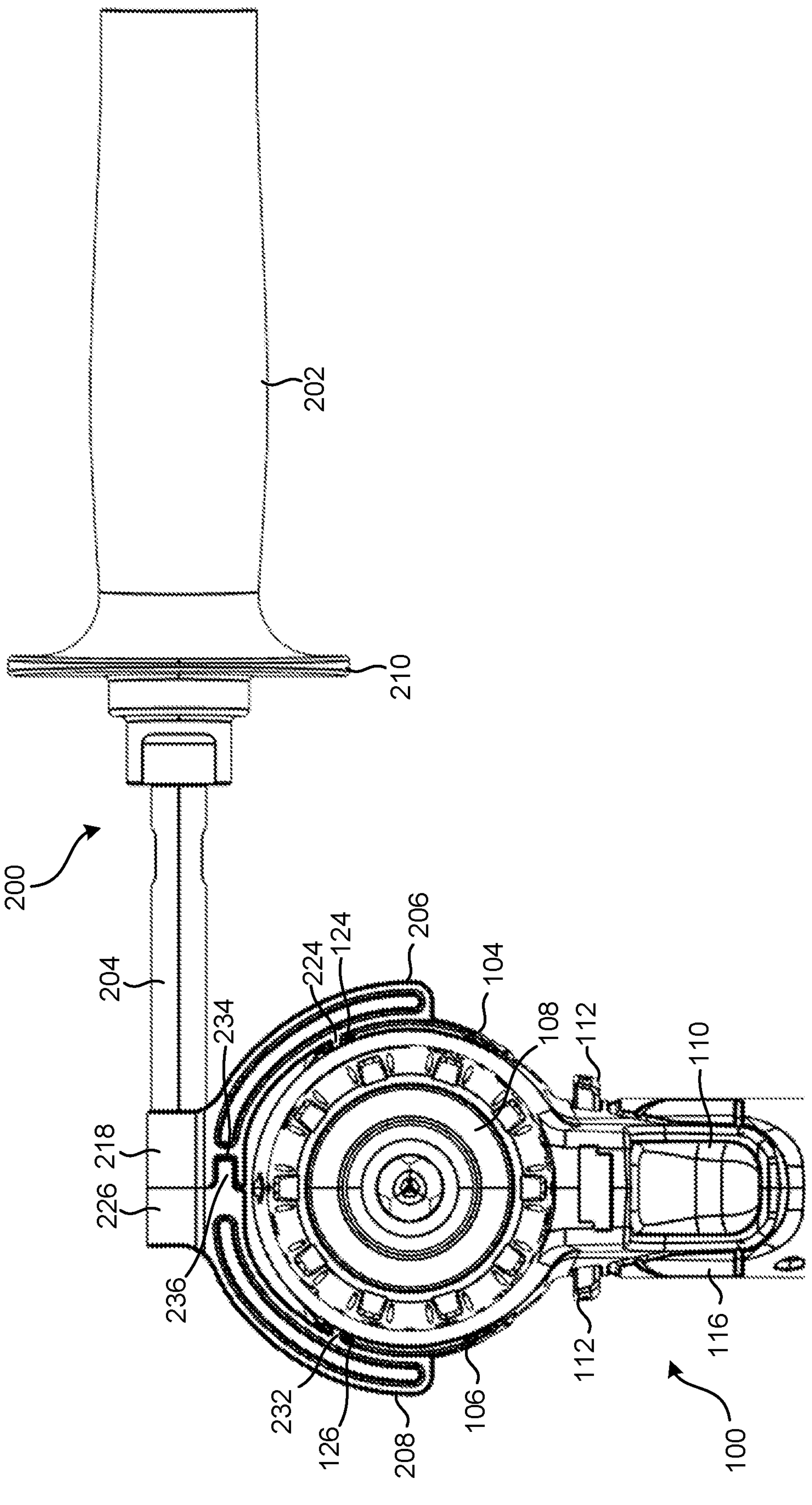
FIG. 2 is a front end view of the exemplar tool and handle of FIG. 1, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a secondary or auxiliary handle for a tool, such as a power tool, and a tool housing that includes features that matingly engage or receive portions of the handle. The handle is adapted to couple onto an exterior surface of the tool housing and minimize damage caused to the tool if the tool is dropped with the handle attached. In an embodiment, the handle includes a gripping portion, a shaft extending from the gripping portion, and first and second clamping portions, wherein each of the first and second clamping portions includes a protrusion that engages or otherwise keys into a corresponding pocket or groove on the tool housing. When coupled to the tool, the shaft is disposed through a corresponding aperture in the first clamping portion and threaded into a corresponding threaded aperture in the second clamping portion. As the shaft is threaded into the second clamping portion the first and second clamping portions are moved or brought closer together and collectively clamp onto the tool housing. The first clamping portion may include a reinforcing rib to provide structural stability and robustness to the handle. The first and second clamping portions may also include a stop mechanism that prevents the first and second clamping portions from being over tightened onto the tool housing, and thus minimizing potential damaging the tool housing.

Referring to FIGS. 1-4, a tool 100 and handle 200 (such as a secondary or auxiliary handle) are illustrated. The tool includes a housing 102 (also referred to as a tool housing) having first and second housing portions 104 and 106 (forming first and second sides of the housing 102, respectively), an output nose mechanism 108 coupled to the housing 102 at a working end of the tool 100, an actuatable trigger 110, and a direction selector 112 (also referred to as an actuator or toggle). In an embodiment, the housing 102 is a clamshell-type housing with first and second housing portions 102 and 104 that are coupled together. In another embodiment, the housing 102 (including the first and second housing portions 102 and 104) may be a single integrated or monolithic piece. The housing 102 includes a motor housing portion 114 and a handle housing portion 116 formed by the assembled first and second housing portions 104 and 106. The motor housing portion 114 and handle housing portion 116 may be disposed at an angle relative to each other. For example, in an embodiment, a longitudinal axis of the motor housing portion 114 and a longitudinal axis of the handle housing portion 116 may be disposed at an angle of about 100 to about 120 degrees, and more particularly about 110 degrees relative to each other.

The motor housing portion 114 may also house a motor with a motor shaft that extends from a working end of the motor, and that is operably coupled to the output nose mechanism 108. A switch mechanism may also be disposed in the motor housing portion 114 or handle housing portion 116, and is operably coupled to the motor. In an embodiment, the actuatable trigger 110 is disposed substantially at an intersection of the handle and motor housing portions 114 and 116, and is operably coupled to the switch mechanism. Actuation of the trigger 110 (such as depression of the trigger 110) causes the motor to operate and rotate the motor shaft in either one of first and second rotational directions in a well-known manner. The trigger 110 may also be biased such that the trigger 110 is depressible inwardly, relative to the tool 100, to cause the tool 100 to operate, and a release of the trigger 110 causes the trigger 110 to move outwardly, relative to the tool 100, to cease operation of the tool 100 via the biased nature of the trigger 110.

The motor may be a brushless or brushed type motor, or any other suitable motor. The trigger 110 and switch mechanism may also be a variable speed type mechanism. In this regard, actuation or depression of the trigger 110 causes the motor to rotate the motor shaft at a faster speed the further the trigger 110 is depressed. The switch mechanism may also be coupled to a controller (which may include a printed circuit board) including battery contacts that couple to corresponding electrical contacts on a removable battery. In this regard, the handle housing portion 116 may include a battery opening 118 adapted to receive and couple to the removable battery. While, the tool 100 is described as being powered by a battery, the tool 100 may be power by other electrical power sources, such as an external wall outlet, etc.

The output nose mechanism 108 may include a chuck adapted to receive a variety of tool bits (including, driver bits, drill bits, cutting bits, socket bits, grinding bits, etc.). The output nose mechanism 108 may receive and engage the shaft of the motor. For example, the output nose mechanism 108 may include a gear or transmission mechanism that couples to the shaft of the motor, and transfers rotation of the shaft to the chuck. Thus, rotation of the shaft of the motor causes rotation of the chuck.

The direction selector 112 is adapted to be moved between first and second positions (for example, by a user) to allow the user to select the desired rotation direction of the motor. For example, movement of the direction selector 112 to the first position causes selection of the first rotational direction, and movement of the direction selector 112 to the second position causes selection of the second rotational direction.

While the tool 100 is described above as having an output nose mechanism 108 with a drill chuck, the tool 100 may have different types of output nose mechanisms. For example, the tool 100 may include a output nose mechanism that includes an hammer type output with a drill chuck or a drive lug. In this example, the output nose mechanism may be coupled to the housing 102 and may include an impact gear mechanism that couples to the shaft of the motor, and transfers rotation of the shaft and a percussive force to the drill chuck or drive lug. Thus, rotation of the shaft of the motor causes rotation of the drill chuck or drive lug, and a hammer type output that delivers a percussive output using impact gears. The drill chuck or drive lug can be coupled to other devices, such as a socket or other adapter, to apply torque to a work piece, such as, for example, a screw or bolt, in a well-known manner.

Figure 3:
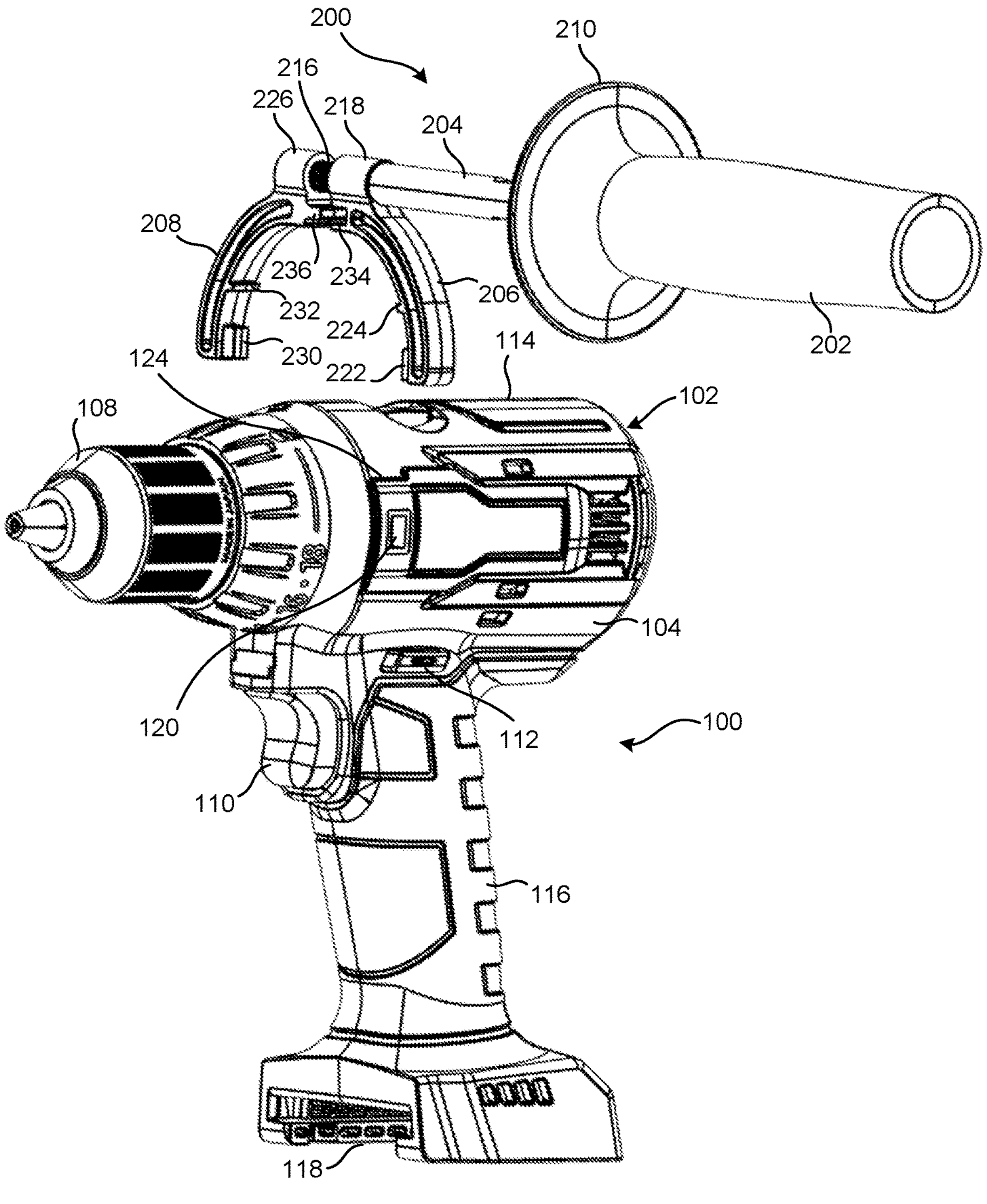
FIG. 3 is a first perspective view of the exemplar tool and handle of FIG. 1, with the handle decoupled from the tool, according to an embodiment of the present invention.
Figure 4:
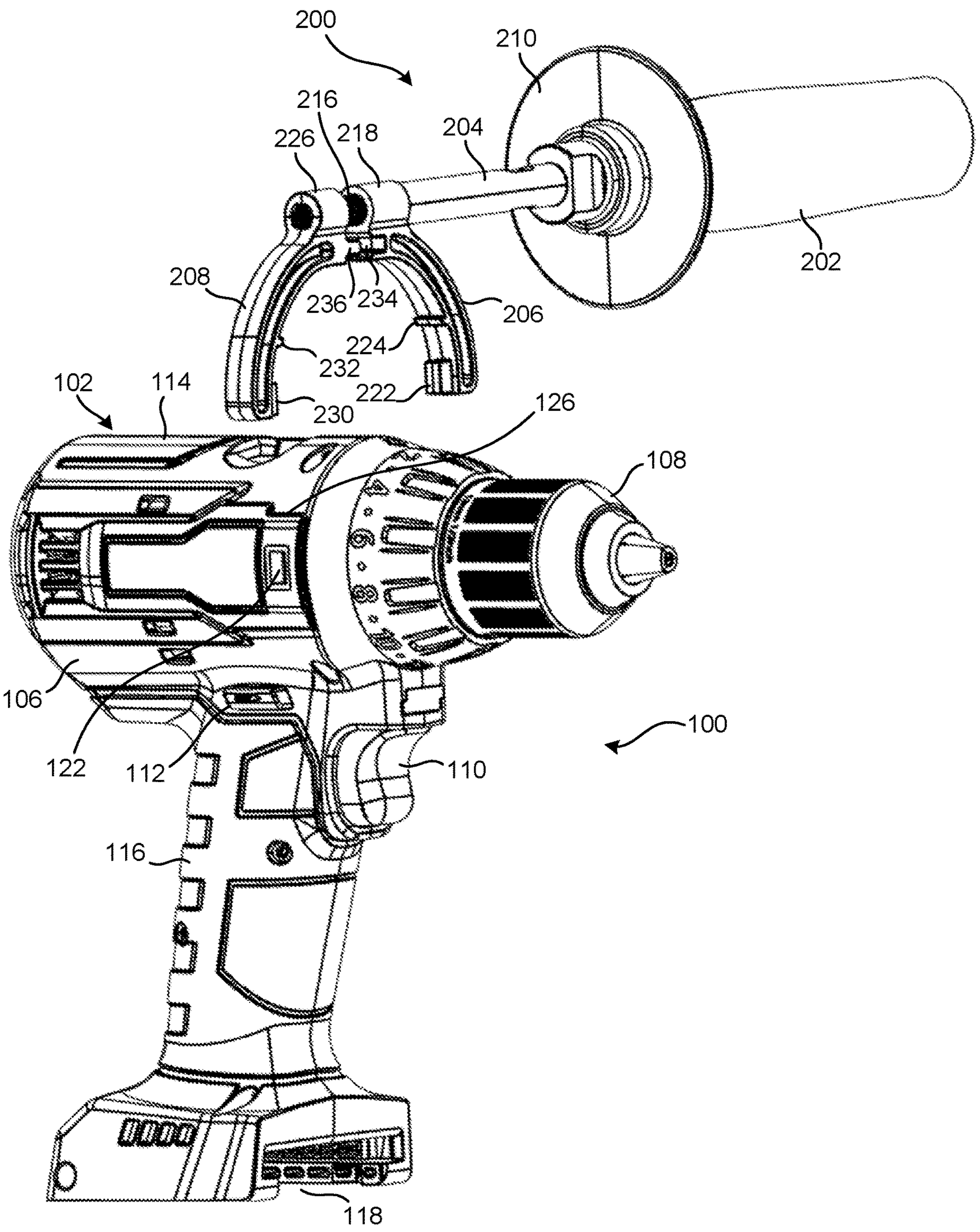
FIG. 4 is a second perspective view of the exemplar tool and handle of FIG. 1, with the handle decoupled from the tool, according to an embodiment of the present invention.

Referring to FIGS. 3 and 4, the housing 102 may include first and second grooves 120, 122 on opposing sides of the housing 102 that are adapted to respectively receive corresponding protrusions of the handle 200, as described in further detail below. For example, the first groove 120 may be disposed in the first housing portion 104, and the second groove 122 may be disposed in the second housing portion 106. The first and second grooves 120, 122 may be respectively integrally formed in the first and second housing portions 104, 106. As illustrated, the first and second grooves 120, 122 are positioned near a front of the motor housing portion 104 proximal to the output nose mechanism 108. However, it will be understood that the first and second grooves 120, 122 may be positioned in other locations on the housing 102.

Each of the first and second grooves 120, 122 may also have a metal insert disposed therein to strength the respective first and second grooves 120, 122, and provide a strong contact material where the corresponding protrusions of the handle 200 engage. The metal insert may be molded directly into the first and second housing portions 104, 106, and/or disposed in the first and second grooves 120, 122 and fixedly coupled to the first and second housing portions 104, 106 in any known manner, including, but not limited to, via the use of adhesives, epoxies, etc.

The housing 102 may also include first and second ledges 124, 126 on opposing sides of the housing 102 that are adapted to respectively engage alignment protrusions of the handle 200, as described in further detail below. For example, the first ledge 124 may be disposed on the first housing portion 104, and the second ledge 126 may be disposed on the second housing portion 106. The first and second ledges 124, 126 may be respectively integrally formed in the first and second housing portions 104, 106. As illustrated, the first and second ledges 124, 126 are positioned near the front of the motor housing portion 104 proximal to the output nose mechanism 108, and above or closer to a top of the housing 102 than the corresponding first and second grooves 120, 122. However, it will be understood that the first and second ledges 124, 126 may be positioned in other locations on the housing 102.

Referring to FIGS. 1-7, the handle 200 includes a gripping portion 202, a shaft 204 extending from the gripping portion 202, and first and second clamping portions 206, 208. The gripping portion 202 may have an ergonomic shape and extend to a guard portion 210 that is adapted to protect a hand of a user. The shaft 204 is coupled to an end of the gripping portion 202 near the guard portion 210. The shaft 204 may be coupled to the gripping portion 202 directly or via an insert.

In an example, an insert 212 is coupled to an end of the gripping portion 202 proximal to the guard portion 210, and the shaft 204 is threadably coupled to the insert 212. In this example, the insert 212 includes a threaded portion, and the shaft 204 includes a threaded aperture in a first end of the shaft 204 that threadably couples to the threaded portion of the insert 212.

The shaft 204 may also include a coupling portion having a reduced diameter or width proximal to a second end of the shaft 204. The coupling portion may include first and second portions 214, 216. The first portion 214 of the coupling portion may have a substantially smooth exterior, and the second portion 216 of the coupling portion may be threaded.

The first and second clamping portions 206, 208 are adapted to be disposed on the housing 102 and removably coupled to the shaft 204. Each of the first and second clamping portions 206, 208 may be shaped to clamp onto the housing 102. For example, each of the first and second clamping portions 206, 208 may have a shape that substantially corresponds with or aligns with an exterior shape of the housing 102. As illustrated, each of the first and second clamping portions 206, 208 has an arc type shape with first and second ends. However, the first and second clamping portions 206, 208 may have other shapes that correspond with or align with the exterior shape of the housing 102. Moreover, the housing 102 may have multiple portions that respectively have different shapes or sizes. It will be understood that the first and second clamping portions 206, 208 only have to have a shape or profile that substantially corresponds with or aligns with the portion of the housing 102 that the clamping portions are adapted to engage.

The first clamping portion 206 may include a first coupling portion 218 proximal to a first end of the first clamping portion 206. The first coupling portion 218 is adapted to receive the shaft 204. For example, the first coupling portion 218 may include an aperture 220 that allows the threaded portion or second portion 216 of the shaft 204 to be inserted through the aperture 220, and the first portion 214 of the shaft 204 to be disposed in the aperture 220.

The first clamping portion 206 also includes a first protrusion 222 that extends inwardly and is disposed proximal to a second end of the first clamping portion 206. The first protrusion 222 is adapted to matingly engage the first groove 120 on the housing 102 when the handle 200 is coupled to the housing 102 of the tool 100.

The first clamping portion 206 may also include a first alignment protrusion 224 that extends inwardly and is disposed between the first and second ends of the first clamping portion 206. The first alignment protrusion 224 is adapted to matingly engage the first ledge 124 on the housing 102 when the handle 200 is coupled to the housing 102 of the tool 100.

Similarly, the second clamping portion 208 may include a second coupling portion 226 proximal to a first end of the second clamping portion 208. The second coupling portion 226 is adapted to receive and couple to the shaft 204. For example, the second coupling portion 226 may include a threaded aperture 228 that threadably couples with the threaded portion or second portion 216 of the shaft 204.

The second clamping portion 208 also includes a second protrusion 230 that extends inwardly and is disposed proximal to a second end of the second clamping portion 208. The second protrusion 230 is adapted to matingly engage the second groove 122 on the housing 102 when the handle 200 is coupled to the housing 102 of the tool 100.

The second clamping portion 208 may also include a second alignment protrusion 232 that extends inwardly and is disposed between the first and second ends of the second clamping portion 208. The second alignment protrusion 232 is adapted to matingly engage the second ledge 126 on the housing 102 when the handle 200 is coupled to the housing 102 of the tool 100.

Figure 5:
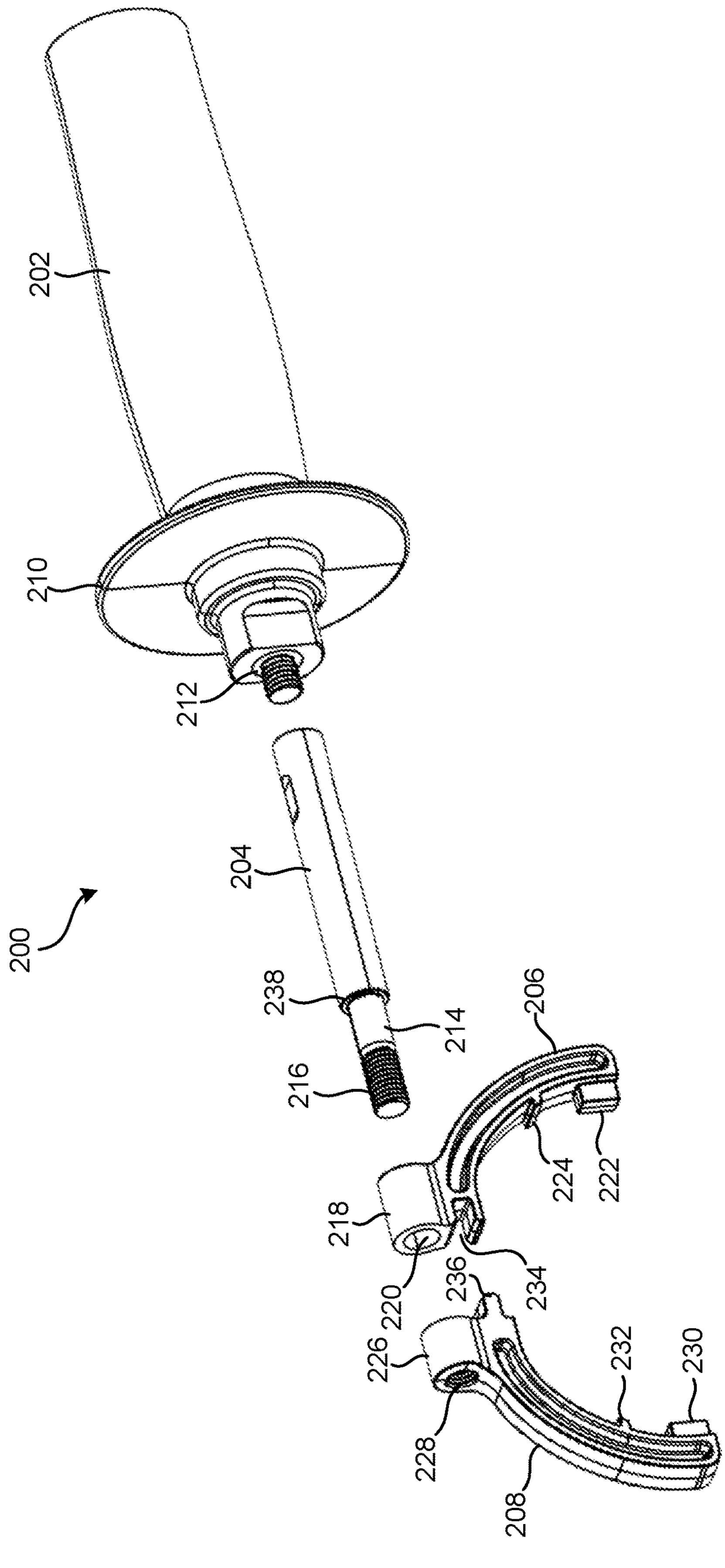
FIG. 5 is an exploded view of a handle, according to an embodiment of the present invention.
Figure 6:
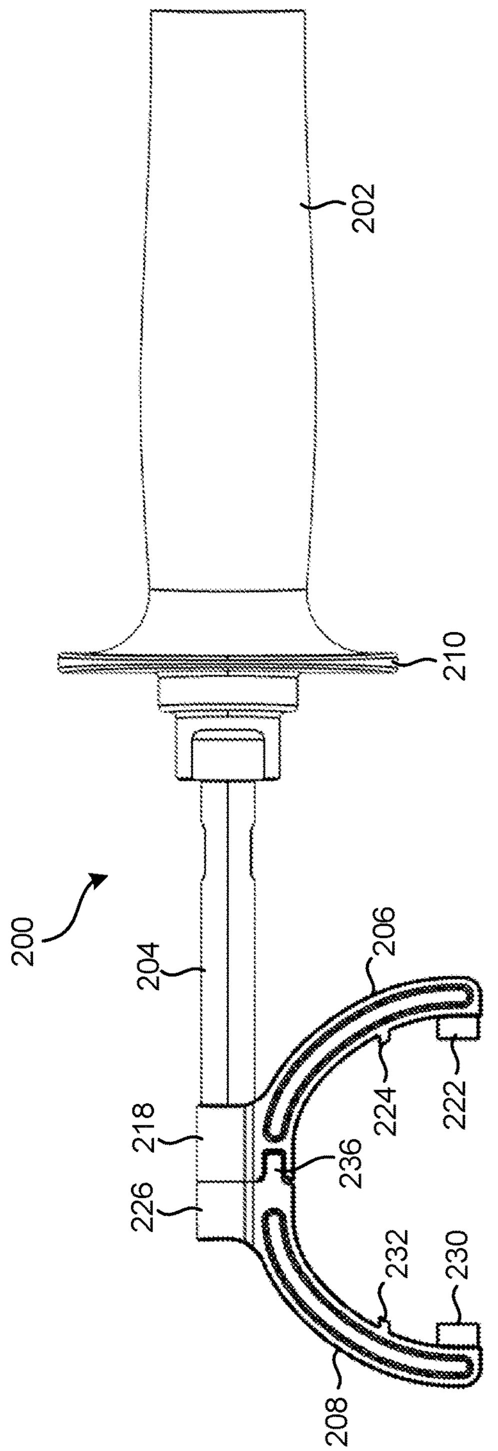
FIG. 6 is a first side view of a handle, according to an embodiment of the present invention.
Figure 7:
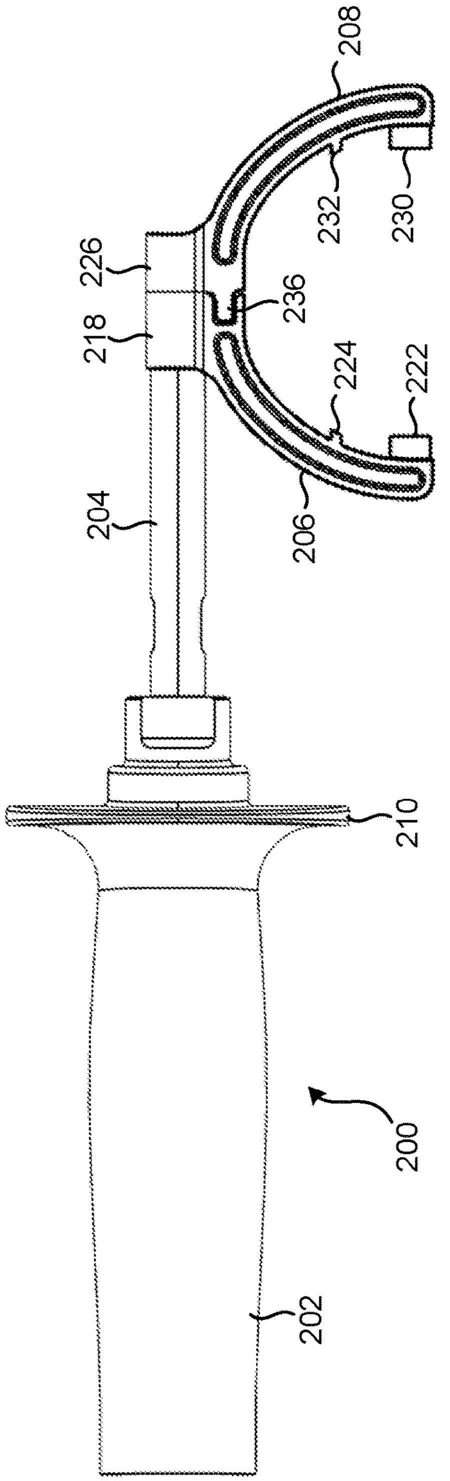
FIG. 7 is a second side view of the handle of FIG. 6, according to an embodiment of the present invention.

The first and second clamping portions 206, 208 may also include a stop mechanism that prevents the first and second clamping portions 206, 208 from being over tightened onto the housing 102. In an example, a tongue and groove type mechanism is used as the stop mechanism. However, other types of stop mechanisms can be used. As illustrated in FIG. 5, the first clamping portion 206 may include a groove 234 and the second clamping portion 208 may include a tongue or protrusion 236 that matingly engages the groove 234 when the handle 200 is coupled to the housing 102 of the tool 100. However, the first clamping portion 206 may include the tongue or protrusion 236, and the second clamping portion 208 may include the groove 234. The reduced diameter portion of the shaft 204 may also provide a ledge or flange 238 that acts as a stop mechanism by contacting an end of the first coupling portion 218 to prevent over tightening.

During coupling of the handle 200 to the tool 100, the first clamping portion 206 is disposed on the housing 102 of the tool 100 (such as the first housing portion 104) with the first protrusion 222 engaged in the first groove 120 and the first alignment protrusion 224 engaged on the first ledge 124. Similarly, the second clamping portion 208 is disposed on the housing 102 of the tool 100 (such as the second housing portion 106), with the second protrusion 230 engaged in the second groove 122 and the second alignment protrusion 232 engaged on the second ledge 126. The first and second coupling portions 218, 226 are also aligned with each other. The threaded portion or second portion 216 of the shaft 204 is inserted through the aperture 220 in the first coupling portion 218 and threaded into the threaded aperture 228 in the second coupling portion 226, with the first portion 214 of the shaft 204 disposed in the aperture 220 in the first coupling portion 218. As the gripping portion 202 of the handle 200 is rotated to tighten the threaded portion or second portion 216 of the shaft 204 into the threaded aperture 228 in the second coupling portion 226, the first and second clamping portions 206, 208 are clamped or moved closer to each other and clamp onto the housing 102 of the tool 100, and the tongue 236 is received in the groove 234. When the first and second clamping portions 206, 208 are clamped onto the housing 102, there may be a small gap remaining between the tongue 236 and a bottom of the groove 234. This ensures that the first and second clamping portions 206, 208 are fully tight against the housing 102, and the stop mechanism does not restrict proper tightening of the first and second clamping portions 206, 208 onto the housing 102. In other embodiments, the tongue 236 may contact the bottom of the groove 234 when the first and second clamping portions 206, 208 are fully tight against the housing 102.

Figure 8:
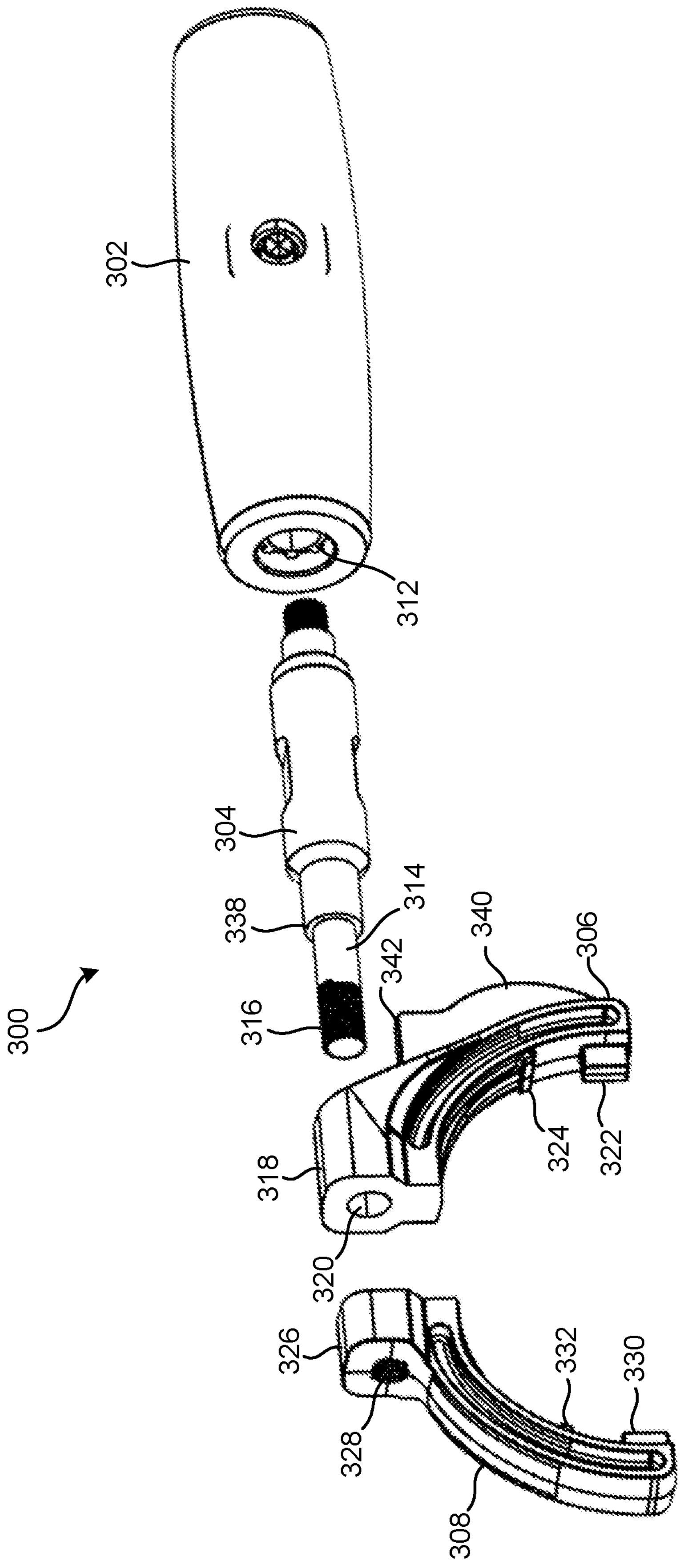
FIG. 8 is an exploded view of another handle, according to an embodiment of the present invention.
Figure 9:
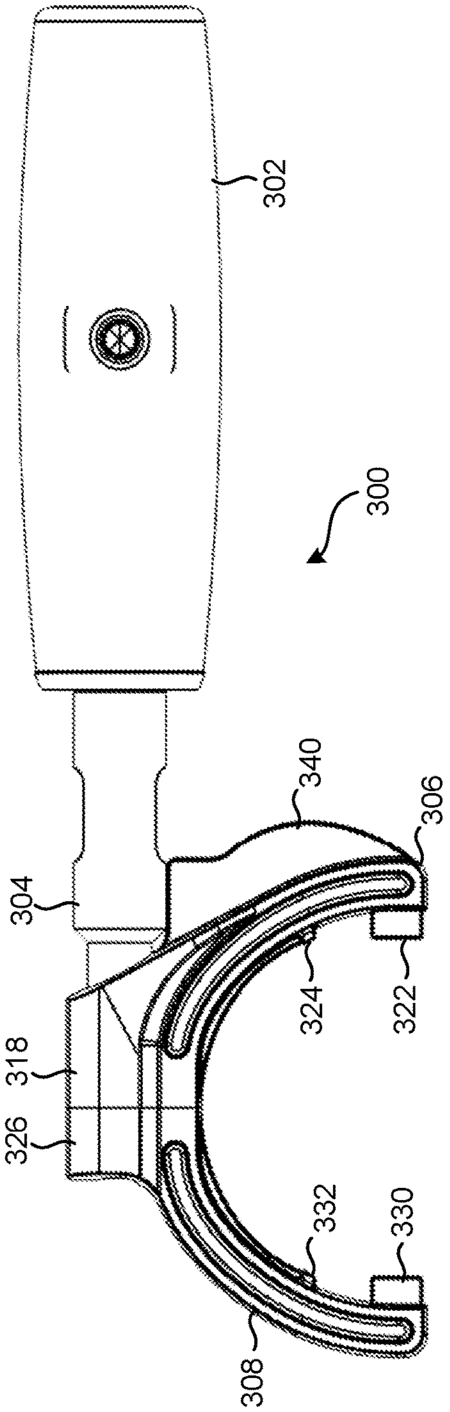
FIG. 9 is a first side view of the handle, according to an embodiment of the present invention.
Figure 10:
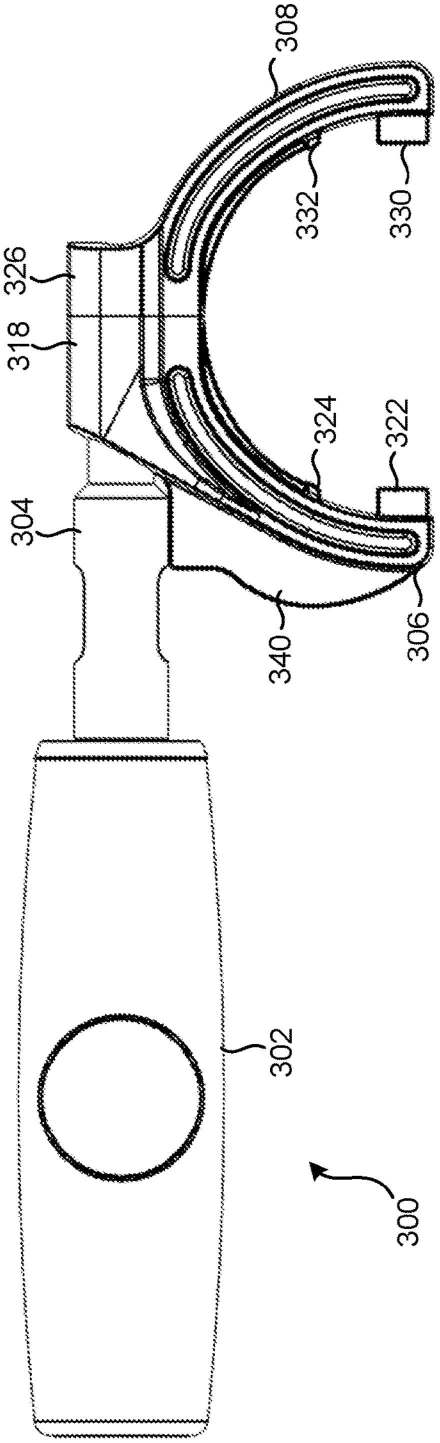
FIG. 10 is a second side view of the handle of FIG. 9, according to an embodiment of the present invention.

Another embodiment of a handle 300 is illustrated in FIGS. 8-10. As illustrated in FIGS. 8-10, similar to the handle 200 (described above), the handle 300 includes a gripping portion 302, a shaft 304 extending from the gripping portion 302, and first and second clamping portions 306, 308. The gripping portion 302 may have an ergonomic shape and, while not shown, may optionally include a guard portion (such as, the guard 210 described above). The shaft 304 is coupled to an end of the gripping portion 302, and may be coupled to the gripping portion 302 directly or via an insert.

In an example, an insert 312 is coupled to an end of the gripping portion 302, and the shaft 304 is threadably coupled to the insert 312. In this example, the insert 312 includes a threaded aperture, and the shaft 304 includes a threaded portion at a first end of the shaft 304 that threadably couples to the threaded aperture of the insert 312.

Similar to the shaft 204 (described above), the shaft 304 may also include a coupling portion having a reduced diameter or width proximal to a second end of the shaft 304. The coupling portion may include first and second portions 314, 316. The first portion 314 of the coupling portion may have a substantially smooth exterior, and the second portion 316 of the coupling portion may be threaded.

Similar to the first and second clamping portions 206, 208 (described above), the first and second clamping portions 306, 308 are adapted to be disposed on the housing 102 and removably coupled to the shaft 304. Each of the first and second clamping portions 306, 308 may be shaped to clamp onto the housing 102. For example, each of the first and second clamping portions 306, 308 may have a shape that substantially corresponds with or aligns with an exterior shape of the housing 102. As illustrated, each of the first and second clamping portions 306, 308 has an arc type shape with first and second ends. However, the first and second clamping portions 306, 308 may have other shapes that correspond with or align with the exterior shape of the housing 102. Moreover, the housing 102 may have multiple portions that respectively have different shapes or sizes. It will be understood that the first and second clamping portions 306, 308 only have to have a shape or profile that substantially corresponds with or aligns with the portion of the housing 102 that the clamping portions are adapted to engage.

Similar to the first clamping portion 206 (described above), the first clamping portion 306 may include a first coupling portion 318 proximal to a first end of the first clamping portion 306. The first coupling portion 318 is adapted to receive the shaft 304. For example, the first coupling portion 318 may include an aperture 320 that allows the threaded portion or second portion 316 of the shaft 304 to be inserted through the aperture 320, and the first portion 314 of the shaft 304 to be disposed in the aperture 320.

The first clamping portion 306 also includes a first protrusion 322 that extends inwardly and is disposed proximal to a second end of the first clamping portion 306. The first protrusion 322 is adapted to matingly engage the first groove 120 on the housing 102 when the handle 300 is coupled to the housing 102 of the tool 100.

The first clamping portion 306 may also include a first alignment protrusion 324 that extends inwardly and is disposed between the first and second ends of the first clamping portion 306. The first alignment protrusion 324 is adapted to matingly engage the first ledge 124 on the housing 102 when the handle 300 is coupled to the housing 102 of the tool 100.

The first clamping portion 306 may also include a reinforcing rib 340 to provide structural stability and robustness to the handle 300. The reinforcing rib 340 may be disposed on an exterior side of the first clamping portion 306 opposite the first protrusion 322 and first alignment protrusion 324, and extend from proximal to the second end of the first clamping portion 306 towards the first end of the first clamping portion 306. The reinforcing rib 340 may also include a ledge 342 that abuts the shaft 304 to provide support to the shaft 304 when the handle 300 is coupled to the housing 102 of the tool 100.

Similarly, like the second clamping portion 208 (described above), the second clamping portion 308 may include a second coupling portion 326 proximal to a first end of the second clamping portion 308. The second coupling portion 326 is adapted to receive and couple to the shaft 304. For example, the second coupling portion 326 may include a threaded aperture 328 that threadably couples with the threaded portion or second portion 316 of the shaft 304.

The second clamping portion 308 also includes a second protrusion 330 that extends inwardly and is disposed proximal to a second end of the second clamping portion 308. The second protrusion 330 is adapted to matingly engage the second groove 122 on the housing 102 when the handle 300 is coupled to the housing 102 of the tool 100.

The second clamping portion 308 may also include a second alignment protrusion 332 that extends inwardly and is disposed between the first and second ends of the second clamping portion 308. The second alignment protrusion 332 is adapted to matingly engage the second ledge 126 on the housing 102 when the handle 300 is coupled to the housing 102 of the tool 100.

While not shown, the first and second clamping portions 306, 308 may optionally include a stop mechanism (such as the tongue and groove type mechanism described above, or other type of stop mechanism) that prevents the first and second clamping portions 306, 308 from being over tightened onto the housing 102. The reduced diameter portion of the shaft 304 may also provide a ledge or flange 338 that acts as a stop mechanism by contacting an end of the first coupling portion 318 to prevent over tightening.

During coupling of the handle 300 to the tool 100, the first clamping portion 306 is disposed on the housing 102 of the tool 100 (such as the first housing portion 104) with the first protrusion 322 engaged in the first groove 120 and the first alignment protrusion 324 engaged on the first ledge 124. Similarly, the second clamping portion 308 is disposed on the housing 102 of the tool 100 (such as the second housing portion 106), with the second protrusion 330 engaged in the second groove 122 and the second alignment protrusion 332 engaged on the second ledge 126. The first and second coupling portions 318, 326 are also aligned with each other. The threaded portion or second portion 316 of the shaft 304 is inserted through the aperture 320 in the first coupling portion 318 and threaded into the threaded aperture 328 in the second coupling portion 326, with the first portion 314 of the shaft 304 disposed in the aperture 320 in the first coupling portion 318. As the gripping portion 302 of the handle 300 is rotated to tighten the threaded portion or second portion 316 of the shaft 304 into the threaded aperture 328 in the second coupling portion 326, the first and second clamping portions 306, 308 are clamped or moved closer to each other and clamp onto the housing 102 of the tool 100. When the first and second clamping portions 306, 308 are clamped onto the housing 102, the ledge 342 of the reinforcing rib 340 may contact or abut the shaft 304 to provide support to the shaft 304.

The engagement of the first protrusion 222/322 in the first groove 120, second protrusion 230/330 in the second groove 122, the first alignment protrusion 224/324 on the first ledge 124, and the second alignment protrusion 232/332 on the second ledge 126 provide for alignment of the handle 200/300 on the tool 100 and resist rotation of the handle 200/300 with respect to the housing 102 of the tool 100. This engagement also minimizes damage caused to the tool 100 when the tool 100 is dropped with the handle 200/300 attached.

As discussed herein, the tool 100 is a power tool, such as a drill or hammer drill. However, the tool 100 can be any electrically or pneumatically powered or hand-held tool, including, without limitation, a drill, hammer drill, router, polisher, ratchet wrench, screwdriver, or other powered tool, that is pneumatically powered, or powered by electricity via an external power source (such as a wall outlet and/or generator outlet) or a battery.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool having a tool housing with first and second portions, the tool comprising:
- first and second grooves respectively disposed in the first and second portions;
- first and second ledges respectively disposed on the first and second portions and respectively spaced from the first and second grooves; and
- a handle adapted to removably couple to the tool housing, the handle including:
  - a shaft having first and second shaft ends; and
  - first and second clamping portions adapted to removably couple to the second shaft end, wherein the first clamping portion includes a first protrusion adapted to matingly engage the first groove and a first alignment protrusion spaced from the first protrusion and adapted to engage the first ledge, and
  - the second clamping portion includes a second protrusion adapted to matingly engage the second groove and a second alignment protrusion spaced from the second protrusion and adapted to engage the second ledge.

2. The tool of claim 1, wherein the handle includes a gripping portion coupled to the first shaft end.

3. The tool of claim 1, wherein the first clamping portion includes a first coupling portion including an aperture adapted to receive the second shaft end.

4. The tool of claim 3, wherein the second clamping portion includes a second coupling portion including a threaded aperture adapted to receive and threadably engage the second shaft end.

5. The tool of claim 4, wherein the shaft includes a smooth portion and a threaded portion proximal to the second shaft end, and wherein the smooth portion is adapted to be disposed in the aperture, and the threaded portion is adapted to threadably engage the threaded aperture.

6. The tool of claim 1, wherein the first and second clamping portions cooperatively include a stop to restrict overtightening of the handle onto the tool housing.

7. The tool of claim 6, wherein the stop is a tongue and groove mechanism.

8. The tool of claim 1, wherein the first clamping portion includes a reinforcing rib on a side of the first clamping portion opposite the first protrusion, and that is adapted to abut the shaft.

9. A housing for a tool, wherein the housing is adapted to removably couple to an auxiliary handle having first and second protrusions and first and second alignment protrusions respectively spaced from the first and second protrusions, the housing comprising:
- first and second housing portions respectively forming first and second sides of the housing;
- first and second grooves respectively disposed in the first and second housing portions, wherein the first and second grooves are adapted to respectively receive the first and second protrusions of the auxiliary handle; and
- first and second ledges respectively disposed on the first and second housing portions and respectively spaced from the first and second grooves, wherein the first and second ledges are adapted to respectively receive the first and second alignment protrusions of the auxiliary handle.

10. The housing of claim 9, wherein the first and second housing portions cooperatively form a motor housing portion and a handle housing portion.

11. The housing of claim 10, wherein the first and second grooves are disposed in the motor housing portion.

12. A handle for a tool, wherein the tool includes a housing having first and second grooves, the handle comprising:

a gripping portion;

a shaft extending from the gripping portion, and having a shaft end opposite the gripping portion; and first and second clamping portions adapted to removably couple to the shaft end, wherein the first clamping portion includes a first protrusion adapted to matingly engage the first groove, and the second clamping portion includes a second protrusion adapted to matingly engage the second groove, and wherein the first and second clamping portions cooperatively form a stop to restrict overtightening of the handle onto the housing, and wherein the stop includes a stop groove on one of the first and second clamping portions, and a stop protrusion on another of the first and second clamping portions and adapted to be received by the stop groove.

13. The handle of claim 12, wherein the first clamping portion includes a first alignment protrusion adapted to engage a first ledge of the housing, and the second clamping portion includes a second alignment protrusion adapted to engage a second ledge of the housing.

14. The handle of claim 12, wherein the first clamping portion includes a first coupling portion including an aperture adapted to receive the shaft end.

15. The handle of claim 14, wherein the second clamping portion includes a second coupling portion including a threaded aperture adapted to receive and threadably engage the shaft end.

16. The handle of claim 15, wherein the shaft includes a smooth portion and a threaded portion proximal to the shaft end, and wherein the smooth portion is adapted to be disposed in the aperture, and the threaded portion is adapted to threadably engage the threaded aperture.

17. The handle of claim 12, wherein the first clamping portion includes a reinforcing rib on a side of the first clamping portion opposite the first protrusion, and that is adapted to abut the shaft when the first and second clamping portions are removably coupled to the shaft end.

18. A handle for a tool including a housing having first and second grooves, the handle comprising:

a gripping portion;

a shaft extending from the gripping portion and having a shaft end opposite the gripping portion;

first and second clamping portions adapted to removably couple to the shaft end, wherein the first clamping portion includes a first protrusion adapted to matingly engage the first groove, and the second clamping portion includes a second protrusion adapted to matingly engage the second groove; and a reinforcing rib disposed on a side of the first clamping portion opposite the first protrusion and that is adapted to abut the shaft when the first and second clamping portions are removably coupled to the shaft end.

19. The handle of claim 18, wherein the first clamping portion includes a first alignment protrusion adapted to engage a first ledge of the housing, and the second clamping portion includes a second alignment protrusion adapted to engage a second ledge of the housing.

20. The handle of claim 18, wherein the first clamping portion includes a first coupling portion including an aperture adapted to receive the shaft end.

21. The handle of claim 20, wherein the second clamping portion includes a second coupling portion including a threaded aperture adapted to receive and threadably engage the shaft end.

22. The handle of claim 21, wherein the shaft includes a smooth portion and a threaded portion proximal to the shaft end, and wherein the smooth portion is adapted to be disposed in the aperture, and the threaded portion is adapted to threadably engage the threaded aperture.

23. The handle of claim 18, wherein the first and second clamping portions cooperatively include a stop to restrict overtightening of the handle onto the housing.

* * * * *